United States Patent [19]

Bryan

[11] Patent Number: 4,664,880
[45] Date of Patent: May 12, 1987

[54] WIRE MESH DEBRIS TRAP FOR A FUEL ASSEMBLY

[75] Inventor: William J. Bryan, Penn Twp., Westmoreland County, Pa.

[73] Assignee: Westinghouse Electric Corp., Pittsburgh, Pa.

[21] Appl. No.: 679,511

[22] Filed: Dec. 7, 1984

[51] Int. Cl.$^4$ .................. G21C 15/00; G21C 3/30
[52] U.S. Cl. ................... 376/352; 376/313; 376/443; 376/446; 210/232; 210/308
[58] Field of Search ............ 376/352, 178, 440, 443, 376/449, 446, 439, 313; 210/305, 306, 308, 299, 232, 499, 478

[56] References Cited

U.S. PATENT DOCUMENTS

| | | | |
|---|---|---|---|
| 1,992,472 | 2/1935 | Craig | 210/308 |
| 3,389,056 | 6/1968 | Frisch | 376/352 |
| 3,528,885 | 9/1970 | Kumpf | 376/440 |
| 3,791,466 | 2/1974 | Patterson et al. | 376/449 |
| 4,032,398 | 6/1977 | Cross et al. | 376/443 |
| 4,096,032 | 6/1978 | Mayers et al. | |
| 4,198,272 | 4/1980 | Salmon | 376/178 |
| 4,376,091 | 3/1983 | Netkowicz et al. | 376/313 |
| 4,427,624 | 1/1984 | Marlatt et al. | |
| 4,505,877 | 3/1985 | Rion | 376/352 |

FOREIGN PATENT DOCUMENTS

| | | | |
|---|---|---|---|
| 1413971 | 9/1965 | France | 376/443 |
| 4141989 | 11/1979 | Japan | 376/352 |
| 1214998 | 12/1970 | United Kingdom . | |

Primary Examiner—Harvey E. Behrend

[57] ABSTRACT

A debris trap is mounted within a bottom nozzle of a fuel assembly so as to capture and retain debris carried by coolant flowing from the lower core plate openings of the nuclear reactor to the fuel assembly. The trap includes a hollow enclosure disposed below the adapter plate of the bottom nozzle and between the corner legs of the nozzle. The enclosure is composed of upper and lower walls and a continuous side wall which spaces apart the upper and lower walls and interconnects their peripheries so as to form a debris capturing and retaining chamber within the hollow enclosure. The walls are composed of a material, such as wire mesh screen, which is permeable to liquid coolant but impermeable to debris. A plurality of wall sections severed from the lower wall and bent into the chamber of the enclosure define a plurality of openings into the chamber. The openings and wall sections which define them are oriented relative to the direction of coolant flow through the enclosure such that any debris which enters the chamber through the openings will be substantially deterred from exiting back through the openings. Also, leaf springs are attached to opposite sides of the enclosure and engagable with a pair of corner legs of the bottom nozzle for releasably locking the trap enclosure in place in the bottom nozzle. Further, a central annular sleeve mounted between the upper and lower walls of th enclosure bolsters the structural integrity of the debris trap.

11 Claims, 3 Drawing Figures

WIRE MESH DEBRIS TRAP FOR A FUEL ASSEMBLY

CROSS REFERENCE TO RELATED APPLICATION

Reference is hereby made to the following co-pending United States patent applications dealing with subject matter related to the present invention:
1. "Debris Trap for a Pressurized Water Nuclear Reactor" by John F. Wilson et al, U.S. Ser. No. 672,040, filed Nov. 16, 1984 (W.E. 52,222).
2. "Fuel Assembly Bottom Nozzle with Integral Debris Trap" by John F. Wilson et al, U.S. Ser. No. 672,041, filed Nov. 16, 1984 (W.E. 52,223).

BACKGROUND OF THE INVENTION

The present invention relates generally to nuclear reactors and, more particularly, is concerned with a trap mounted in the bottom nozzle of a fuel assembly for capturing and retaining debris left in the reactor after assembly, repair and/or replacement operations and thereby preventing entry and loading thereof in the fuel assembly where the debis can cause cladding perforations in the fuel rods and other damage to the fuel assembly.

DESCRIPTION OF THE PRIOR ART

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems.

In particular, fuel assembly damage due to debris trapped at the bottom grid has been noted in several reactors in recent years. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris lodges in the region of the lowermost grid within the spaces between its "egg-crate" shaped cell walls and the lower end portions of the fuel rod tubes. Almost all of the debris is deposited just above the four coolant flow openings in the lower core support plate.

Several different approaches have been proposed and tried for carrying out removal of debris from nuclear reactors. Many of these approaches are discussed in U.S. Pat. No. 4,096,032 to Mayers et al. While all of the approaches described in this patent operate reasonably well and generally achieve their objectives under the range of operating conditions for which they were designed, a need still exists for a fresh approach to the problem of debris removal in nuclear reactors. The new approach must be compatiable with the existing structure and operation of the components of the reactor, be effective throughout the operating cycle of the reactor, and at least provide overall benefits which out weigh the costs it adds to the reactor.

SUMMARY OF THE INVENTION

The present invention provides a debris trap designed to satisfy the aforementioned needs. The debris trap has a hollow wire mesh enclosure adapted to fit the present existing bottom nozzle of the fuel assembly without modification thereof. The trap is positioned between the adapter plate of the bottom nozzle and the upper surface of the lower core support plate such that entry openings of the trap which correspond in number and relative positions to the coolant flow openings in the lower core plate are aligned over the core plate openings. The entry openings of the trap are defined by angularly-extending wall sections which substantially allow only one-way movement of debris through the openings concurrently with the flow of coolant through the wire mesh enclosure of the trap. Thus, the debris is retained within the hollow trap which permits removal of the debris along with the trap and fuel assembly at the next refueling.

Accordingly, the present invention sets forth in a fuel assembly for a nuclear reactor including a plurality of nuclear fuel rods, at least one grid supporting the fuel rods in an organized array, and an end nozzle disposed adjacent the grid and liquid coolant flowing through the end nozzle and into the fuel assembly, a trap for capturing and retaining debris carried by the flowing coolant to prevent entry of debris into the fuel assembly. The debris trap includes: (a) a hollow enclosure disposed adjacent the end nozzle on an opposite side thereof from the grid, the enclosure being composed of a material which is permeable to liquid coolant but impermeable to debris carried by the coolant; (b) the enclosure having upper and lower walls spaced apart and interconnected at their peripheries so as to define a debris capturing and retaining chamber within the enclosure; and (c) means on the hollow enclosure defining at least one opening into the chamber of the enclosure through the lower wall, the opening defining means being disposed in a predetermined positional relationship with respect to the direction of coolant flow such that debris carried by the liquid coolant flow which enters the chamber of the enclosure through the opening will be substantially detered from exiting through the opening.

More particularly, the opening defining means on the lower wall of the debris trap hollow enclosure includes a wall section which extends into the chamber at an angle to the direction of coolant flow. The wall section has an inner edge displaced inwardly from adjacent portions of the lower wall so as to define the opening to the chamber at a position located generally between the upper and lower walls of the chamber and in a plane extending generally parallel to the direction of coolant flow. Preferably, the trap includes a plurality of entry openings in the hollow debris trap enclosure which are matched in number and position to the coolant flow openings of the bottom core plate of the reactor so that the trap entry openings are located directly above the core plate openings when the trap is mounted in the bottom nozzle of the fuel assembly.

The trap also includes a central annular sleeve mounted between the upper and lower wall of the trap enclosure for bolstering the structural integrity of the trap enclosure and providing access to the central instrumentation tube of the fuel assembly. Furthermore, the trap enclosure is sized to fit within the end nozzle and includes means in the form of a pair of leaf springs for releasably locking it within the end nozzle.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
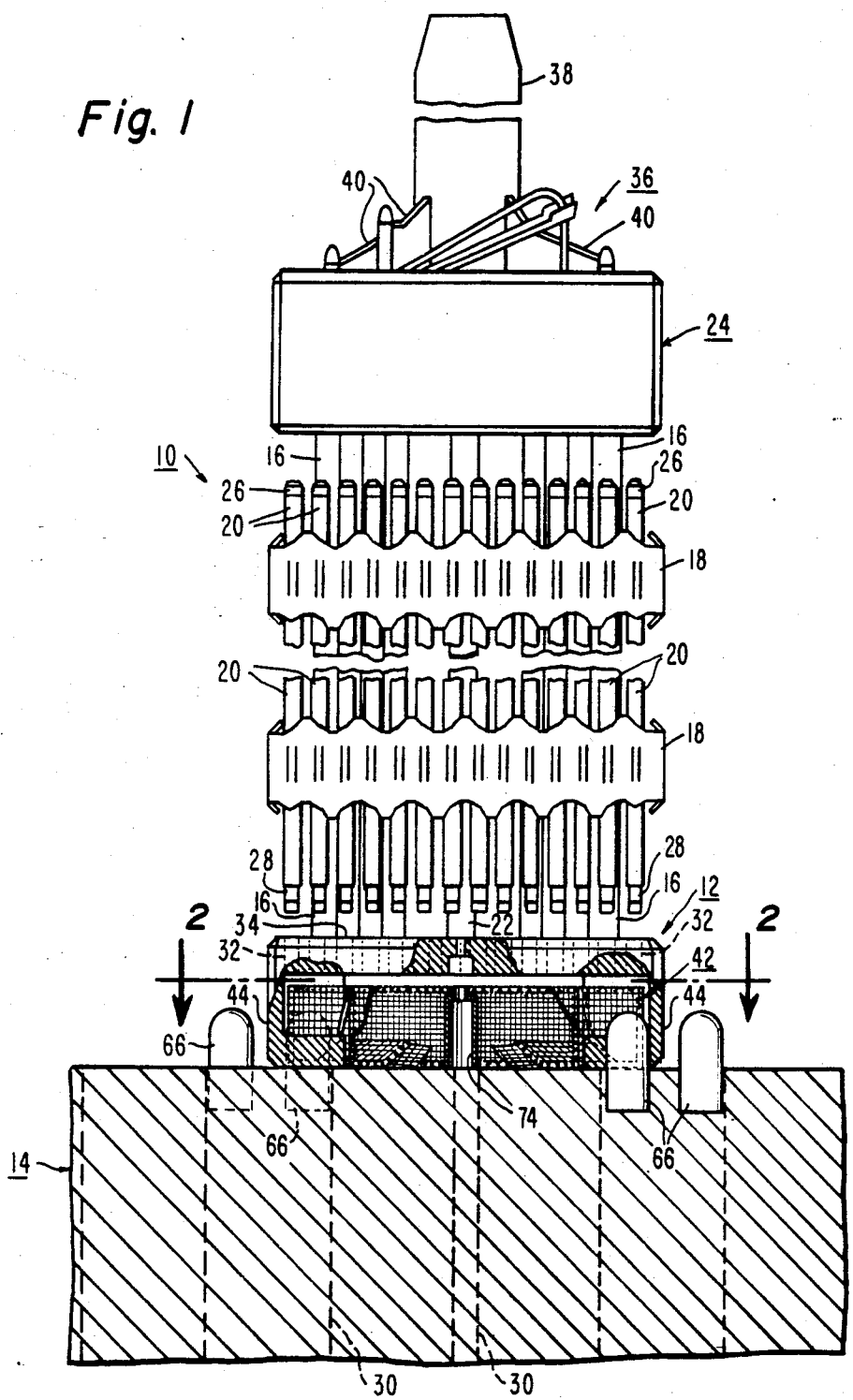
FIG. 1 is an elevational view, partly in section, of a fuel assembly which incorporates the debris trap of the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized wate reactor and basically includes a lower end structure or bottom nozzle 12 for supporting the assembly on a lower core support plate 14 in the core region of a reactor (not shown), and a number of longitudinally extending guide tubes or thimbles 16 which project upwardly from the bottom nozzle 12. The assembly 10 further includes a plurality of transverse grids 18 axially spaced along the guide thimbles 16 and an organized array of elongated fuel rods 20 transversely spaced and axially supported by the grids 18. Also, the assembly 10 has an instrumentation tube 22 located in the center thereof and an upper end structure or top nozzle 24 attached to the upper ends of the guide thimbles 16. With such an arrangement of parts, the fuel assembly 10 forms an integral unit capable of being conveniently handled without damaging the assembly parts.

As mentioned above, the fuel rods 20 in the array thereof in the assembly 10 are held in spaced relationsihp with one another by the grids 18 spaced along the fuel assembly length. Each fuel rod 20 includes nuclear fuel pellets (not shown) and is closed at its opposite ends by upper and lower end plugs 26,28. The fuel pellets composed of fissile material are responsible for creating the reactive power of the reactor. A liquid moderator/coolant such as water, or water containing boron, is pumped upwardly through a plurality of flow openings 30 in the lower core plate 14 to the fuel assemblies. The bottom nozzle 12 of each assembly 10 has a series of flow holes 32 defined in its upper central adapter plate 34 through which the coolant flows upwardly through the guide thimbles 16 and along the fuel rods 20 of the fuel assembly in order to extract heat generated therein for the production of useful work.

To control the fission process, a number of control rods (not shown) are reciprocally movable in the guide thimbles 16 located at predetermined positions in the fuel assembly 10. Specifically, the top nozzle 24 includes a rod cluster control mechanism 36 having an internally threaded cylindrical member 38 with a plurality of radially extending flukes or arms 40. Each arm 40 is interconnected to a control rod such that the control mechanism 36 is operable to move the control rods vertically in the guide thimbles 16 to thereby control the fission process in the fuel assembly 10, all in a well-known manner.

Debris Trap Mounted in Bottom Nozzle

As mentioned above, fuel assembly damage due to debris trapped at the lowermost one of the grids 18 has been noticed in recent years. Therefore, to prevent occurrence of such damage, it is highly desirable to trap and remove this debris before it reaches the lowermost grid 18.

The present invention relates to a debris trap, generally indicated by the numeral 42, mounted inside or within the bottom nozzle 12 adjacent to and below its upper central adapter plate 34 and between its corner legs 44, as illustrated in FIG. 1. The trap 42 is positioned across the path of coolant flow from the lower core plate openings 30 to the adapter plate holes 32 so as to capture debris, such as small loose parts or pieces, from the flowing coolant and thereby prevent it from entering the fuel assembly 10. Instead, the debris is retained within the trap 42 which permits removal of the debris along with the trap 42 and fuel assembly 10 at the next refueling.

Figure 2:
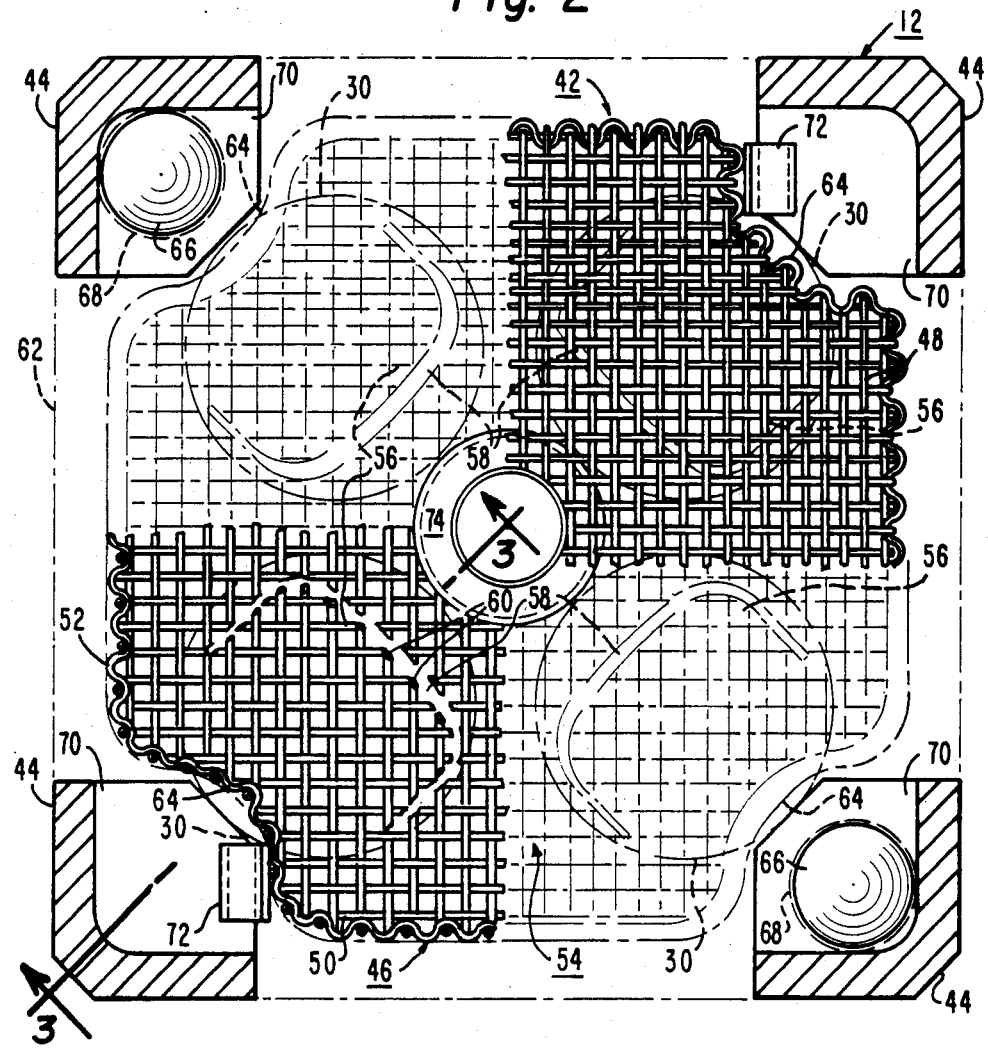
FIG. 2 is an enlarged top plan view of the debris trap as seen along line 2—2 of FIG. 1, illustrating the legs of the bottom nozzle of the fuel assembly, partly in sectional form, and only portions of the upper and lower walls of the hollow enclosure of the debris trap.
Figure 3:
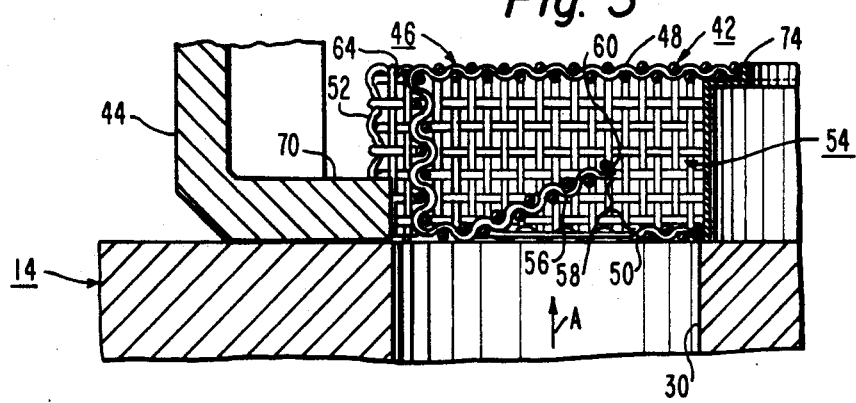
FIG. 3 is an enlarged fragmentary view of the debris trap enclosure, partly in section, as seen along line 3—3 of FIG. 2, showing the wall section which forms one of the openings into the debris capturing and retaining chamber of the hollow trap enclosure.

Turning now to FIGS. 2 and 3, the debris trap 42 includes a hollow enclosure 46 having upper and lower walls 48,50 and a continuous side wall 52 which interconnects the upper and lower walls at their respective peripheries and spaces them apart so as to define a debris capturing and retaining chamber, generally indicated 54, within the enclosure 46. The walls 48,50,52 of the enclosure 46 are composed of any suitable material permeable to the liquid coolant but impermeable to debris carried by the coolant. For instance, in the illustrated embodiment, the walls 48,50,52 are composed of a wire mesh material in screen or layer form.

As the liquid coolant flows upwardly from the openings 30 in the lower core plate 14 through the debris trap enclosure 46, means on the lower wall 50 of the hollow enclosure 46 in the form of a plurality of flap-like wall sections 56 define a plurality of openings 58 into the hollow enclosure 46 through which debris carried by the coolant flow can enter the trap chamber 54. In the illustrated embodiment, being an example of one way in which to form the openings 58, each of the wall sections 56 is a portion of the lower wall 50 which has been partially severed therefrom and then bent inwardly into the chamber 54 so as to extend at an acute angle, for instance thirty degrees, to the remainder of the lower wall 50. The wall sections 56 forming the openings 58 are matched in number and alignment with the plurality of coolant flow openings 30 in the lower core plate 14 so as to place the openings 58 into the trap enclosure chamber 54 directly above the lower core plate openings 30.

The angle at which each of the wall sections 56 is stationarily disposed relative to adjacent portions of the lower wall 50 places the wall section 56 in a generally transverse or inclined position across the direction of the coolant flow path, as indicated by arrow A in FIG. 3, from the lower core plate openings 30 through the trap enclosure 46. Because of such positional relationship of the wall section 56 to the remainder of the lower wall 50, each of the entry openings 58 defined between the inner edge 60 of the wall section 56 and adjacent portions of the lower wall 50 lie in a plane extending generally parallel to the direction of coolant flow through the hollow enclosure 46. Thus, in order for debris carried by the coolant flow to enter the debris capturing and retaining chamber 54, the debris must impact one of the wall sections 56 and be deflected laterally therefrom through one of the openings 58. Once the debris has entered the chamber 54, it will be substantially deterred from exiting back through one of the openings 58 due to their orientation parallel to the coolant flow path. Instead, once the debris is within the chamber 54, the coolant flow will tend to press the debris against the upper wall 48 of the trap enclosure 46.

Parenthetically, it will be noticed that the inner edge 60 of each wall section 56 is U-shaped and thereby is made up of multiple edge portions. Thus, the opening 58 defined between such multiple portions of the inner edge 60 and the adjacent portions of the remainder of the lower wall 48 lies in multiple planes which all extend parallel to the direction A of coolant flow through the hollow enclosure 46.

As seen in FIGS. 1 and 2, the debris trap enclosure 46 has overall cross-sectional dimensions sized to allow the enclosure to fit within the peripheral skirt 62 of the bottom nozzle 12 between the corner legs 44 thereof and extend generally coplanar with the adapter plate 34 of the nozzle. Generally arcuate-shaped depressions 64 are defined in the corners of the enclosure 46. One diagonal pair of the depressions 64 provide adequate space for a diagonal pair of alignment pins 66 which extend upright from the lower core plate 14 and fit through openings 68 formed through flanges 70 of one diagonal pair of the corner legs 44. The other diagonal pair of the depressions 64 provide adequate space for means in the form of a pair of leaf springs 72 disposed in the depressions 64 and anchored on the trap enclosure 46 to engage the flanges 70 of the other diagonal pair of corner legs 44 for locking the enclosure 46 within the bottom nozzle 12 upon installation of the trap 42 therein. Preferably, in the installed position of the trap 42, the upper wall 48 of its enclosure 46 is spaced a short distance below the adapter plate 34 so that water flow through the holes 32 of the adapter plate is not obstructed.

The trap 42 is installed from the bottom of the fuel assembly 10 when the assembly has been removed from the reactor core. The retaining or locking leaf springs 72 deflect inwardly due to contact with the bottom flanges 70 of the nozzle legs 44 as the trap 42 is inserted into the bottom nozzle 12. The springs 72 then snap outwardly over the flanges 70 when the springs have cleared the top thereof. The trap 42 is then locked in place in the sense that it will not drop out of the bottom nozzle 12 when the fuel assembly 10 is moved.

The hollow enclosure 46 of the debris trap 42 also has a central annular sleeve 74 mounted between the upper and lower walls 48,50 of the enclosure for two purposes. First, the sleeve 74 which rests on the lower core plate 14 serves to bolster the structural integrity of the hollow enclosure 46. Second, it allows access to the lower end of the instrumentation tube 22 to where it is attached to the bottom nozzle adapter plate 34.

It is thought that the debris trap of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a fuel assembly for a nuclear reactor including a plurality of nuclear fuel rods, at least one grid supporting said fuel rods in an organized array, an end nozzle having a central transverse adapter plate disposed adjacent said grid and a lower end of said fuel rods with a series of coolant flow holes defined therethrough which allow liquid coolant flow through said end nozzle and into said fuel assembly, a trap for capturing and retaining debris carried by said coolant flow to prevent entry of debris into said fuel assembly, said debris trap comprising:

(a) a hollow enclosure disposed across said end nozzle adjacent to said transverse adapter plate and on an opposite side thereof from said grid, said enclosure being composed of material formed into a wire mesh screen which is permeable to the liquid coolant but impermeable to debris carried by the coolant;

(b) said hollow enclosure having upper and lower walls extending across said end nozzle, spaced apart and interconnected at their peripheries so as to define a debris capturing and retaining chamber within said enclosure, one of said upper and lower walls being disposed adjacent to said adapter plate and the other of said walls being disposed away from said adapter plate; and (c) means on said hollow enclosure defining at least one opening into said chamber of said enclosure through said other of said upper and lower walls disposed away from said adapter plate, said opening defining means being disposed in a predetermined positional relationship with respect to the direction of coolant flow such that debris carried by said liquid coolant flow which enters said chamber of said enclosure through said opening will be substantially deterred from exiting through said opening;

(d) said opening defining means on said other wall including a wall section which is connected to said other wall, disposed at an angle to said other wall and the direction of coolant flow and is displaced at an inner edge from said other wall, so as to define said opening between its inner edge and said other wall in a plane extending generally parallel to the direction of coolant flow through said hollow enclosure and so as to define a path along which the debris must move in order to enter said chamber through said opening in a direction substantially transverse to the direction of coolant flow through said hollow enclosure.

2. The debris trap as recited in claim 1, wherein opening defining means includes a plurality of said wall sections defining a plurality of said openings into said chamber of said hollow enclosure.

3. The debris trap as recited in claim 1, wherein said wall section is a portion of said other wall which has been partially severed from the remainder of said other wall and bent inwardly to extend at said angle to said remainder of said other wall.

4. The debris trap as recited in claim 3, wherein:
said partially severed wall section has multiple edge portions; and
said opening defined between said multiple edge portions of said partially severed wall section and said adjacent portions of said remainder of said other wall lies in multiple planes extending generally parallel to the direction of coolant flow through said hollow enclosure.

5. The debris trap as recited in claim 1, wherein said hollow enclosure has cross-sectional dimensions sized to fit said enclosure within said end nozzle, and said trap further includes means on said enclosure for releasably locking it within said end nozzle such that said trap will be retained with said end nozzle when moved with said fuel assembly.

6. The debris trap as recited in claim 5, wherein said locking means is in the form of a pair of leaf springs disposed on opposite sides of said enclosure and engagable with said end nozzle upon installation of said enclosure in said end nozzle.

7. The debris trap as recited in claim 1, further including a central annular sleeve mounted between said upper and lower walls of said hollow enclosure for bolstering the structural integrity of said hollow enclosure.

8. In a liquid cooled nuclear reactor having a plurality of fuel assemblies supported on a lower core plate, each of said fuel assemblies and said lower core plate being constructed to allow coolant flow therethrough, said fuel assembly including a plurality of nuclear fuel rods, a plurality of grids axially disposed along and supporting said fuel rods in an organized array, a bottom nozzle having a central adapter plate disposed adjacent a lowermost one of said grids and a lower end of said fuel rods, said adapter plate having a series of coolant flow holes defined therethrough and a plurality of transversely-displaced legs extending downwardly from the periphery of said adapter plate for supporting said fuel assembly on said lower core plate of said reactor and in alignment with a plurality of coolant flow openings in said lower core plate, and liquid coolant flowing from said openings in said lower core plate and through said holes in said bottom nozzle adapter plate, a trap for capturing and retaining debris carried by said flowing coolant to prevent entry of debris into said fuel assembly, said debris trap comprising:

(a) a hollow enclosure disposed between said bottom nozzle adapter plate and said lower core plate and in a path of coolant flow from said openings in said core plate and to said holes in said adapter plate, said hollow enclosure being composed of material formed into wire mesh screen which is permeable to the liquid coolant but impermeable to debris carried by the coolant;

(b) said hollow enclosure having an upper wall disposed adjacent said adapter plate, a lower wall located away from said adapter plate and a side wall which interconnects said upper and lower walls at their respective peripheries and spaces said upper and lower walls apart so as to define a debris capturing and retaining chamber within said enclosure, said upper and lower walls extending between said legs of said bottom nozzle; and (c) a plurality of wall sections on said lower wall being connected to adjacent portions of said lower wall and displaced at inner edges of said wall sections within said chamber inwardly toward said upper wall and away from said adjacent portions of said lower wall so as to define a plurality of openings into said hollow enclosure through said lower wall being matched in number and alignment with said plurality of coolant flow openings in said lower core plate, said each wall section also being disposed at an angle to the direction of coolant flow through said enclosure such that said opening defined between said inner edge of said each wall section and adjacent portions of said lower wall lies in a plane extending generally parallel to the direction of coolant flow through said hollow enclosure and such that debris carried by said coolant flow which enters said chamber of said enclosure through said opening will be substantially detered from exiting through said opening.

9. The debris trap as recited in claim 8, wherein each of said wall sections is a portion of said lower wall which has been partially severed from the remainder of said lower wall and bent inwardly to extend at said angle to said remainder of said lower wall.

10. The debris trap as recited in claim 8, further comprising means on said enclosure for releasably locking it within said bottom nozzle such that said enclosure will be retained with said bottom nozzle when moved with said fuel asembly, said locking means being in the form of a pair of leaf springs disposed on opposite sides of said enclosure and engagable with at least two of said bottom nozzle legs upon installation of said enclosure in said bottom nozzle.

11. The debris trap as recited in claim 8, further including a central annular sleeve mounted between said upper and lower walls of said hollow enclosure for bolstering the structural integrity of said hollow enclosure.

* * * * *